United States Patent [19]

Sula

[11] Patent Number: 4,853,580
[45] Date of Patent: Aug. 1, 1989

[54] PIEZOELECTRIC PULSE GENERATOR

[75] Inventor: Stanley J. Sula, Portland, Oreg.

[73] Assignee: Tektronix, Inc., Beaverton, Oreg.

[21] Appl. No.: 229,061

[22] Filed: Aug. 5, 1988

[51] Int. Cl.$^4$ ............................................. H01L 41/08
[52] U.S. Cl. ..................................... 310/339; 310/319; 310/328
[58] Field of Search ................. 310/328, 338, 339, 319

[56] References Cited

U.S. PATENT DOCUMENTS

| | | | |
|---|---|---|---|
| 2,309,703 | 2/1943 | Lovell et al. | 310/339 X |
| 2,921,252 | 1/1960 | Schiavone | 310/339 X |
| 3,056,933 | 10/1962 | Wood | 310/339 X |
| 3,174,419 | 3/1965 | Sable | 310/339 X |
| 3,539,841 | 11/1970 | Riff | 310/339 |
| 4,091,302 | 5/1978 | Yamashita | 310/339 |
| 4,156,825 | 5/1979 | Kondo et al. | 310/339 X |
| 4,379,245 | 4/1983 | Goldstein | 310/339 X |
| 4,409,548 | 10/1983 | Focht | 310/339 X |
| 4,510,935 | 4/1985 | Spencer | 310/339 X |
| 4,691,117 | 9/1987 | Greenwood et al. | 310/339 X |

OTHER PUBLICATIONS

Marcus, *Ferroelectric Polymers and Their Applications*, vol. 32, 1981, p. 149.
Carlisle, "Piezoelectric Plastics Promise New Sensors", *Machine Design*, Oct. 23, 1986, pp. 105-110.
Crane, "Poly(vinylidene) Fluoride Used for Piezoelectric Coin Sensors", *IEEE Transactions on Sonics and Ultrasonics*, vol. SU-25, No. 6, Nov. 1978, pp. 393-395.
Toda, "A PVF Piezoelectric Bimorph Device for Sensing Presence and Position of Other Objects", *IEEE Transactions on Electron Devices*, vol. ED-26, No. 5, May 1979, pp. 815-817.
Pennwalt Corporation Brochure, "KYNAR Piezo Film", 8 pages undated.
Pennwalt Corporation, Untitled, 88 pages, published in 1983.

*Primary Examiner*—Mark O. Budd
*Attorney, Agent, or Firm*—Edward B. Anderson; Peter J. Meza

[57] ABSTRACT

A rotary pulse generator is disclosed which generally includes a wheel rotatable about an axis. The wheel has a plurality of protrusions which deflect a piezoelectric element in a deflection zone. Several embodiments are shown. The various features include a thumbwheel in which the turning surface has teeth on it serving as the protrusions, a thumbwheel in which the teeth are directed radially inwardly, a push/pull knob which places the wheel in alignment with a selected one of three piezoelectric elements, and a wheel held in selected positions by an indent/detent mechanism with rods extending out of the side of the wheel to deflect the piezoelectric element. Yet another embodiment provides for the combination of linear and rotary pulse generation. Another form provides four sets of indicator locations with a location from each of the sets forming an aligned row of indicator locations. The protrusions are disposed selectively in the indicator locations to give each row a unique binary code when sensed by four associated piezoelectric elements.

14 Claims, 3 Drawing Sheets

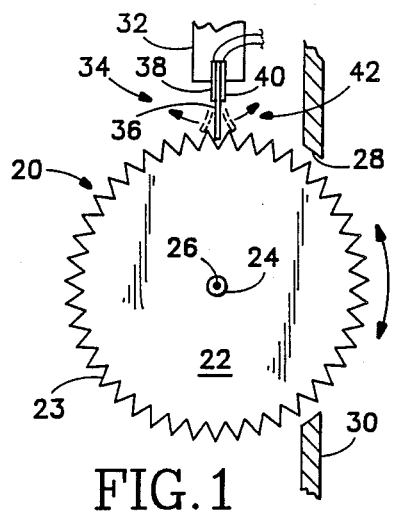
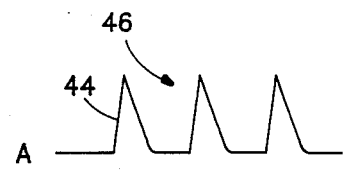
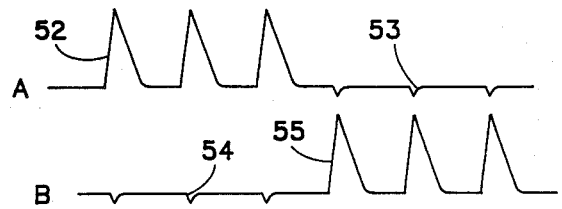
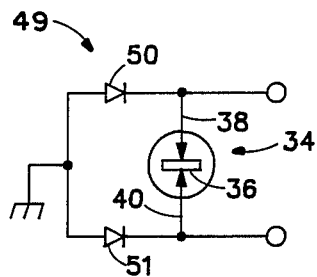
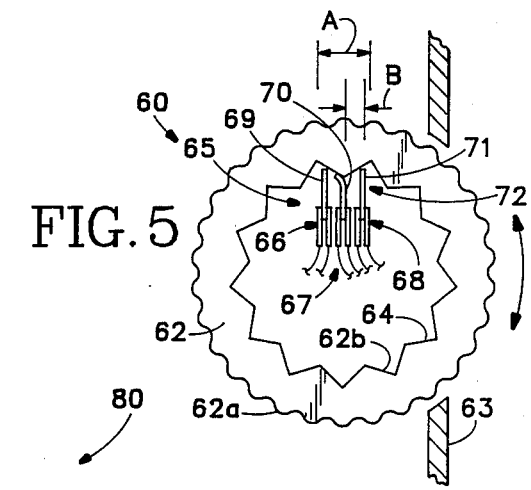
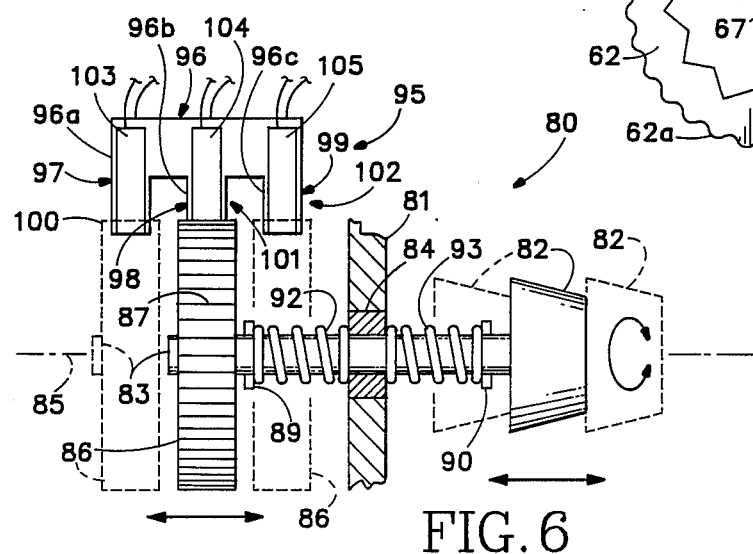

PIEZOELECTRIC PULSE GENERATOR

FIELD OF THE INVENTION

This invention relates to pulse generators, and in particular, pulse generators using piezoelectric films to convert mechanical motion into electrical pulses.

BACKGROUND OF THE INVENTION

Many forms of devices exist which are used to sense the relative position of a mechanical object relative to a reference position. For example, optical encoders are used commonly to sense rotational movement of one member relative to another member. In robotics, one member is in the form of an arm which is moved about a joint. Also, such encoders are used to keep track of rotational movement of a motor shaft relative to a frame on which it is mounted. Yet another application is in the turning of knobs of a control panel for adjusting an associated instrument. Traditionally, such knobs had a multiplicity of electrical contacts which a wiper moved across, with each contact corresponding to a predetermined knob setting.

Such apparatus tends to be relatively expensive. Optical transmitters and receivers are in themselves quite complex. A multiplicity of electrical conductors and contacts must be provided to accommodate each of the positions of a knob or other rotating member. They also require external power supplies to make them work. Elaborate or duplicate elements are also required in order to sense the direction of rotation of the member being moved. Physical contacts are subject to corrosion and dirt, and require careful and elaborate engineering to survive adverse environments. Further, optical encoders or potentiometers do not have any inherent detent action which would provide tactile feedback of knob position. If such is desired, it must be added to the assembly.

Many electrical systems are currently structured to use CMOS logic in order to take advantage of the low power and minimal drive requirements inherent in CMOS devices. In order to accommodate conventional devices, interface circuitry must be provided in order to produce voltage swings compatible with CMOS logic. Many conventional devices, such as potentiometers, are damaged if washed. This is particularly important during manufacture, where an assembly needs to be washed after soldering.

SUMMARY OF THE INVENTION

The present invention provides an apparatus for overcoming these disadvantages of the known prior art. In particular, it provides a pulse generator for converting mechanical motion into a series of electrical pulses. This is provided by a piezoelectric element which is used to generate electrical pulses when deflected.

Piezoelectricity is a capability of certain crystalline materials to change their dimensions when subjected to an electric field or to produce an electrical signal when mechanically deformed. This property has been known to exist since the late 1800's in certain naturally, occurring crystals. Only recently have synthetic materials been discovered which exhibit piezoelectric properties. One such substance which is made as a thin film is known as polyvinylidene fluoride. See, for instance, Marcus, *Ferroelectric Polymers and Their Applications, Ferroelectrics,* Vol. 32, 1981, p. 149; Carlisle, "Piezoelectric Plastics Promise New Sensors", Machine Design. October 23, 1986, pp. 105–110; Crane, "Poly(vinylidene) Fluoride Used for Piezoelectric Coin Sensors", *IEEE Tractions on Sonics and Ultrasonics,* Vol. SU-25, No. 6, November 1978, pp. 393–395; and Toda, "A PVF Piezoelectric Bimorph Device for Sensing Presence and Position of Other Objects", *IEEE Transactions on Electron Devices.* Vol. ED-26, No. 5, May 1979, pp. 815–817. A piezoelectric film is available commercially under the trademarked name KYNAR by Pennwalt Corporation of King of Prussia, Pennsylvania. It is thoroughly described in an 83-page document of Pennwalt Corporation apparently published in 1983. Although a wide variety of uses have been made and proposed for the piezoelectric film, none are presently known which use it as provided by the present invention.

In particular, the present invention provides a pulse generator comprising at least one piezoelectric element having opposite sides and extending into a deflection zone, for producing a voltage between the opposite sides when deflected in a predetermined manner. A pair of electrical terminals are coupled to opposite sides of the piezoelectric element for receiving a voltage generated by the deflected element. Deflection means are provided for deflecting at least one element in a manner producing a series of voltage pulses. This is preferably in the form of a plurality of protrusions supported serially at spaced locations. Means are then also provided for driving the protrusions sequentially through the deflection zone in a manner deflecting the piezoelectric element appropriately for producing the series of voltage pulses.

Various preferred embodiments are provided to apply the invention to different applications. For instance a thumb wheel can carry the protrusions which deflect a piezoelectric film. The protrusions may be the contact surface of the thumbwheel or a separate contact surface may be provided.

This concept may be extended to the use of a knob which turns a wheel having the protrusions, which knob can be pushed or pulled to position the wheel adjacent different piezoelectric elements for controlling a plurality of functions.

The piezoelectric element provides tactile feedback due to inherent detent action for positioning of the piezoelectric element precisely between protrusions. If relatively few elements are provided and more specific positioning is desired, an indent/detent member may be used.

The position of a rotating shaft can also be established by the generation of a code, such as a binary code, by the use of a plurality of sets of indicator locations, each set being associated with a separate piezoelectric element. An indicator location is simply a position on a body which provides a bit of code information based on the existence or non-existence of a code-indicating unit at that position. The protrusions take up a subset of and are located in the indicator locations. A group of indicator locations, formed of an indicator location in each set, when driven past the piezoelectric elements, generates a coded signal determined by whether a protrusion exists in each set for that group.

It will be seen that such a rotary pulse generator made according to the invention provides position control with high resolution in a simple, inexpensive manner. Because of the nature of piezoelectric elements, the polarity of output pulse is indicative of the direction of movement of the protrusions. The pulses are output on two terminals which may be directly input to a CMOS logic circuit. Piezoelectric elements have been shown to have a long life, resulting in reliability. Further, pulse generators of a small size may be made, since the elements themselves may be made quite small. Manufacturing is also simplified as compared to conventional devices since there is no damage from washing after soldering of the assembly in which it is positioned.

These and other features and advantages of the present invention will because apparent from the following detailed description when read in conjunction with the associated drawings.

BRIEF DESCRIPTION OF THE DRAWINGS

FIG. 1 is a side view of a first embodiment made according to the present invention.

FIG. 2 is a chart showing output signals of the embodiment of FIG. 1.

FIG. 3 is a schematic diagram of a circuit usable with the embodiment of FIG. 1.

FIG. 4 is a chart showing output signals of the circuit of FIG. 3.

FIG. 5 is a side view of a second embodiment made according to the invention.

FIG. 6 is a side view of yet a third embodiment of the invention.

DETAILED DESCRIPTION OF THE PREFERRED EMBODIMENTS

Figure 7:
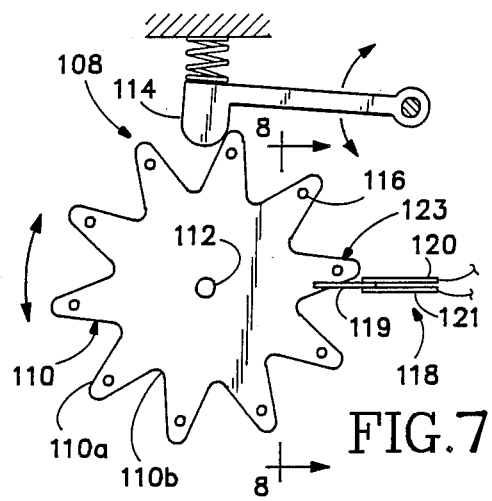
FIG. 7 is a side view of a fourth embodiment of the invention.

Referring initially to FIGS. 1 and 2, a pulse generator 20 made according to the present invention is shown. Generator 20 is shown as a thumbwheel control which is manually operated. A thumbwheel 22 has a multiplicity of protrusions or teeth 23 extending radially from the wheel circumference. The wheel is disposed on a shaft. 24 for rotation about an axis 26 defined by the shaft. A portion of the teeth on the wheel are exposed through an opening 28 in a panel 30. Panel 30 would typically be the front control panel of an instrument which is controllable, such as for controlling the trace of an oscilloscope. It will be understood that a straight rack of teeth could also provide the same results as wheel 22.

Mounted to a frame 32 of the instrument is a piezoelectric transducer 34. Transducer 34 includes a piezoelectric element 36 formed of a piezoelectric film, such as polyvinylidene fluoride mentioned previously, with a metalized coating on opposite faces for receiving charge build-up during flexing of the film. A pair of metal strips form electrical terminals 38 and 40 mounted on opposite sides of the piezoelectric element for transmitting the signal produced on the element.

Element 36 is disposed into what may be referred to as a deflection zone 42. Wheel 22 is positioned so that teeth 23 pass through zone 42 as it is rotated. The teeth contact element 36 and deflect it in the direction of tooth travel. As each tooth passes through the deflection zone, deforming the piezoelectric element and releasing the element as the tooth passes, a pulse such as pulse 44 shown in FIG. 2A is created. The passage of successive teeth generates a pulse train shown generally at 46. Alternately, a wheel having a plurality of spaced elements along its circumference could be rotated next to a protrusion which deflects the elements.

When wheel 22 is rotated in a reverse direction pulses 48 of opposite polarity are generated across terminals 38 and 40 as shown in FIG. 2B. These pulse trains may then be fed into a register to keep track of the position or speed of wheel 22, such as to control a feature of the instrument it is associated with according to the number of pulses generated. With the addition of an up-down counter to output terminals 38 and 40, a digital potentiometer is produced. The resolution of the wheel rotation sensing is controlled by varying the number of teeth and/or the number of elements 36, such as will be described with reference to FIG. 5.

The circuit 49 of FIG. 3 may also be applied to terminals 38 and 40, as shown, in order to generate direction-indicating pulses on two separate lines with respect to a common reference, such as chassis or other ground. The diodes 50 and 51 limit currents in each branch of circuit 49 to the directions shown by the resulting signals illustrated in FIG. 4. Terminal 38 has positive going pulses 52 shown in FIG. 4A when the wheel is turned in a first direction. When it is turned in the opposite direction, glitches 53 are produced. On terminal 40, the opposite is true. That is, as shown in FIG. 4B, when the wheel is rotated in the first direction, glitches 54 are produced, and when rotated in the second direction, pulses 55 are produced. In effect then, pulses appear on one or the other of the outputs depending on the direction of wheel rotation.

FIG. 5 shows an alternate form of a rotary pulse generator 60 using a thumbwheel 62 having a portion extending through an instrument panel 63. This thumbwheel has a textured outer circumference 62a and an inner opening 62b with radially inwardly directed teeth 64. This structure allows for the structuring of the thumbwheel outer surface independently of the design of the teeth. A piezoelectric transducer 65 comprises three assemblies 66, 67 and 68 like transducer 34 of FIG. 1.

These assemblies are positioned so that the circumferential length A of each tooth 64 is three times the distance B between each pair of piezoelectric film elements 69, 70 and 71. As a tooth passes through the deflection zone 72 containing the elements, the elements are deflected sequentially. There are thus generated a series of equally spaced output pulses, when combined, which occur three times for the passage of each tooth. Thus, the position of the thumbwheel is determined with a resolution that is three times that of a single tooth. This, then, represents one way to increase the resolution of a pulse generator made according to the invention. Depending on space requirements, the additional elements could also be positioned to have separate deflection zones around its inside circumference or could be spaced longitudinally along the axis of rotation of wheel 62.

A third embodiment of the invention is shown in FIG. 6. In this figure, a pulse generator 80 is mounted in a panel 81. It includes a manually operable knob 82 mounted on a shaft 83. The shaft passes through a bearing 84 mounted in panel 81 for rotation about an axis 85 of the shaft. Attached to the distal end of the shaft is a wheel 86 having teeth 87 extending radially outwardly from it, similar to wheel 22 of FIG. 1. Spaced away from panel 81 on shaft 83 are a pair of opposite stops 89 and 90. Disposed between these stops and bearing 84 are tension springs 92 and 93, each of which urges the shaft in the direction of the spring from the bearing. The two springs thus are counter acting, tending to hold the shaft in an intermediate position shown by the solid lines. The knob may be pushed or pulled in order to position wheel 86 in either of the two positions shown by the dashed lines.

Disposed in alignment with each of the three wheel positions is a transducer assembly 95 having a piezoelectric film 96 with fingers 96a, 96b and 96c forming piezoelectric elements 97, 98 and 99 in respective deflection zones 100, 101 and 102. Each film finger has associated metallic coatings such as coatings 103, 104 and 105 shown in the figure. Electrical terminals are then connected to these coatings. When the wheel is in one of the three positions and turned, pulses are generated on a corresponding one of the three pairs of terminals. Thus, this structure allows the basic piezoelectric element of the invention to be used for a multifunction knob, each longitudinal position of the knob corresponding to a particular function.

Figure 8:
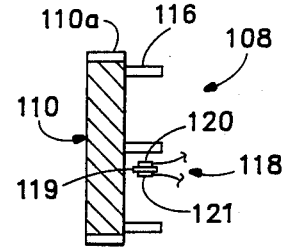
FIG. 8 is a cross section taken along line 8—8 of FIG. 7.

A fourth embodiment of the invention is shown in FIGS. 7 and 8 as a pulse generator 108. A wheel 110 is mounted for rotation on a shaft 112. The wheel has pronounced radially outwardly extending rounded fingers 110a disposed around its periphery. Between these fingers are indentatior's 110b which mate with a detent 114. The detent is spring biased toward wheel 110 so that the wheel is held specifically in a position in which the detent is in the indentation when the wheel is not being turned.

Extending parallel with shaft 112, and therefore with the axis of rotation of wheel 110, from each of fingers 110a is a rod 116. A piezoelectric transducer 118 formed of element 119 and terminals 120 and 121 is disposed in a deflection zone 123. The deflection zone is positioned so that rods 116 pass through it, deflecting the piezoelectric element as they do so. Since the element is incapable of holding the wheel in a selected rotational position against moderate forces, the indent/detent mechanism serves this function, while signals from transducer 118 provide an electrical indication of the position of the wheel. This embodiment is particularly useful where wheel positioning is desired in discrete positions and does not involve rapid wheel movement.

Figure 9:
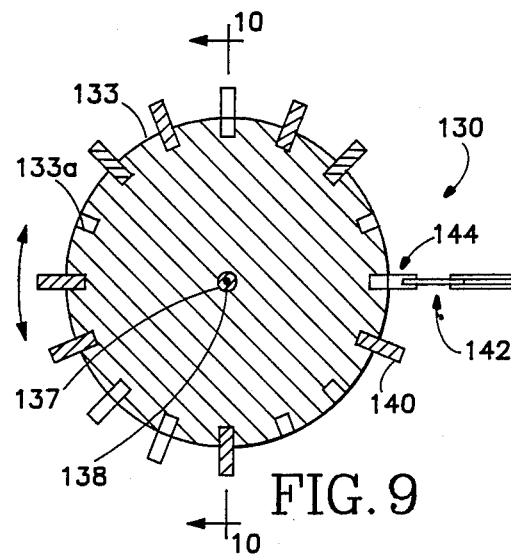
FIG. 9 is a side cross section of a portion of a fifth embodiment made according to the invention.
Figure 10:
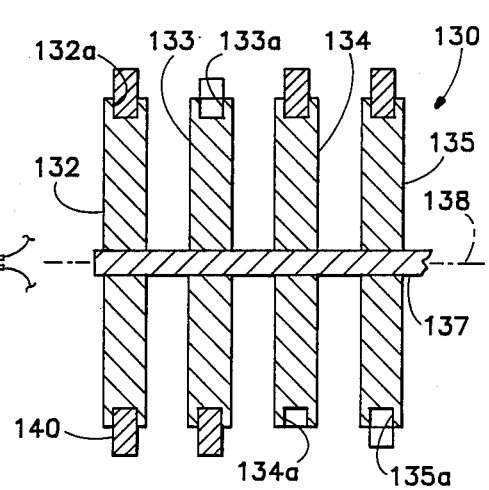
FIG. 10 is a cross section taken along line 10—10 of FIG. 9.

The present invention also provides the capability for generating digital signals which are coded to indicate, at each incremental turn of a shaft, a code indicating the specific rotational position of the shaft. Two embodiments for doing so are shown in FIGS. 9–12. The first of these, pulse generator 130, is shown in FIGS. 9 and 10. Included are a set of four Wheels 132, 133, 134 and 135 fixedly mounted to a shaft 137 for rotation about an axis 138. A set of cavities 132a, 133a, 134a and 135a are disposed around the peripheries of the wheels. These cavities are formed to provide a friction fit of members 140 which can be selectively inserted therein. The cavities are equally spaced around the wheels and are aligned longitudinally along axis 138.

A piezoelectric transducer 142 is mounted adjacent each wheel to define a deflection zone 144 through which any mounted members 140 pass during rotation of the wheels. The cavities in each row thus provide an indication location for generating a code element signal, with the four signals from the four transducers forming the code. When a member is present in the cavity, a pulse is generated by the corresponding transducer. Correspondingly, when no member is present, no pulse is generated. Thus, at each incremental rotational position of shaft 137, a code is generated to indicate the specific location of the shaft. Since the members may be removed and reinserted in the cavities, the code may be changed as desired to fit different applications.

It will be appreciated that the four sets of cavities could equally as well have been put on a single, broad wheel. Further, any desired number of sets of cavities could be used to generate a code providing the desired resolution.

Figure 11:
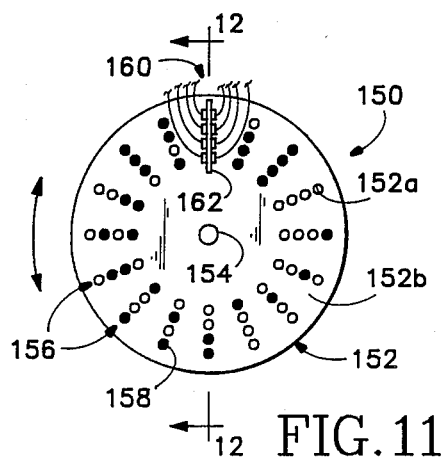
FIG. 11 is a side view of a sixth embodiment of the invention.
Figure 12:
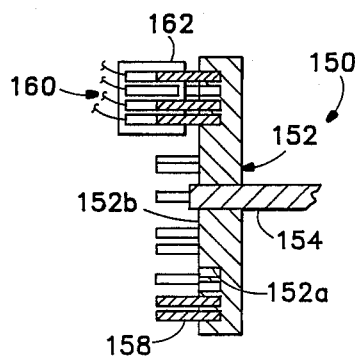
FIG. 12 is a cross section of the embodiment of FIG. 11 taken along line 12—12 of that figure.

An embodiment of a pulse generator 150 similar to generator 130 is shown in FIGS. 11 and 12. Generator 150 includes a wheel 152 mounted for rotation on a shaft 154. Sixteen rows, such as row 156, of cylindrical cavities 152a extend longitudinally in the side 152b of the wheel. The rows extend radially from shaft 154 with the sets of cavities forming the first, second, third and fourth cavity in each row being in concentric circles about the shaft.

In selected ones of the cavities a rod portion or finger 158 is friction fit. These fingers extend parallel to shaft 154, as shown. In FIG. 11, the presence of a finger is shown as a dark circle, whereas the absence of a finger is shown as a light circle. In each row 156 of cavities there is a unique combination of light and dark circles. Thus, each rotational position of the wheel, in sixteen increments, is uniquely identified.

As with the embodiment of FIGS. 9 and 10, the code is identified, and therefore the rotational position of the wheel determined, by a piezoelectric transducer 160. The transducer has four piezoelectric elements 162 extending into the paths of fingers 158 as they travel around the concentric paths. As with the prior embodiment, a code is generated at each sixteenth revolution of the wheel determined by the combination of pulses and nonpulses at each position. Again, by making the fingers removable from the cavities, different coding schemes may be used.

Figure 13:
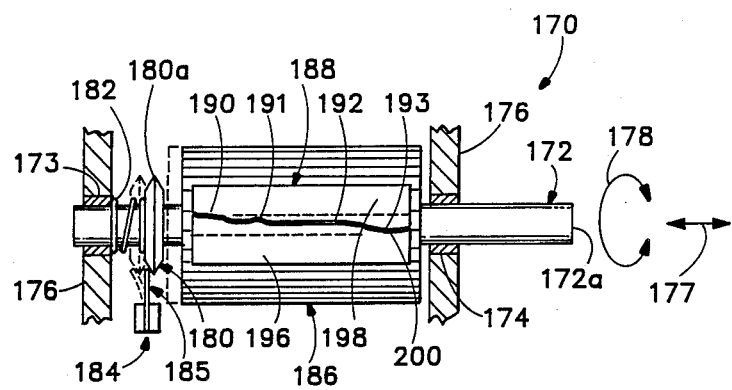
FIGS. 13 and 14 are top and side views, respectively, of the final embodiment of the invention.
Figure 14:
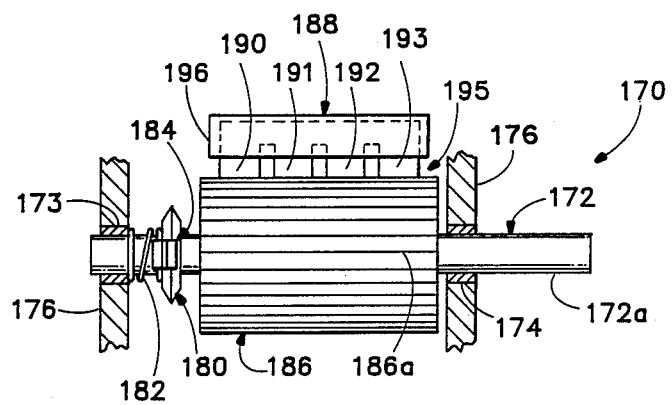

The final embodiment of the invention is illustrated in FIGS. 13 and 14. This embodiment is a combination linear and rotary pulse generator 170. Rotation is about a shaft 172 mounted in bearings 173 and 174 to respective portions of a frame 176. The right end 172a of the shaft is connected to a mechanical actuator, such as a manually operable knob, not shown, which may be used to control a signal or other variable of an operating system. The shaft is movable along its longitudinal axis, as shown by arrow 177, and is rotatable about the same axis, as shown by arrow 178.

Attached at a fixed position to shaft 172 at a location spaced from bearing 173 is a ring 180 having a circumferentially extending protrusion or ridge 180a. A spring 182 is positioned between the ring and frame 176 associated with bearing 173. This spring urges the shaft to the rest position shown in solid lines. When the shaft is pushed to the left as viewed in the figures, the spring is placed in compression. When the pressure is released from the shaft, it returns to the original or rest position.

Mounted in a fixed position relative to frame 176 is a piezoelectric element 184 positioned to be deflected in a deflection zone 185 by ridge 180a when ring 180 is pushed to the left. The deflection and release of element 184 produces a single electrical pulse. This action can thus be used in a variety of ways, such as an on/off switch or a toggle to select alternate scales or function's.

A cylinder 186 having longitudinally extending ridges or protrusions 186a disposed on its circumference is mounted fixedly and coaxially with shaft 172. Positioned above the top of cylinder 186 is an assembly 188 of four piezoelectric elements 190, 191, 192 and 193 defining a deflection zone 195. The cylinder is long enough longitudinally so that the elements are always adjacent ridges 186a regardless of the position of shaft 172. The four elements are held in staggered positions relative to ridges 186a as shown in FIG. 13, by mounting blocks 196 and 198. These blocks hold a single piezoelectric film 200 sandwiched between them to form elements 190, 191, 192 and 193. The blocks also provide a single set of electrical contacts for the elements.

Thus, as cylinder 186 rotates, the four piezoelectric elements are deflected serially, rather than concurrently. This is similar to the embodiment of FIG. 5 except that by spacing the elements along the length of the ridges, they in effect can be spaced closer together relative to the rotation of the cylinder. This allows finer rotational resolution of shaft 172.

It will thus be appreciated that the embodiment of FIGS. 13 and 14 provides a dual-action pulse generator, utilizing both linear and rotary pulse generation. Further, these two pulse-generating sources are operable individually and concurrently.

Several embodiments have been used to illustrate various features of a pulse generator made according to the invention. It will be apparent that other designs and applications can be provided which are useful for practicing the invention in its general sense. Thus, although specific embodiments have been described, various changes in form and detail may be made without parting from the spirit and scope of the invention as defined in the claims.

I claim:

1. A pulse generator comprising:
   a plurality of piezoelectric elements each having opposite sides and extending into a corresponding deflection zone, for producing a voltage between said opposite sides when deflected in a predetermined manner;
   a pair of electrical terminals coupled to said opposite sides of each element for receiving a voltage produced by each said element;
   a plurality of protrusions supported serially at spaced locations and disposed for rotation about an axis of rotation for deflecting each element when traveling through the corresponding deflection zone, said protrusions being positionable in a plurality of selected positions along said axis of rotation, said protrusions passing through a different selected one of said deflection zones when disposed in each selected position; and
   means for driving said protrusions sequentially relative to each element through the corresponding deflection zone in a manner deflecting said piezoelectric film appropriately for producing a series of voltage pulses between said electrical terminals.

2. A generator according to claim 1 further comprising biasing means for yieldably urging said protrusions toward one of said positions.

3. A pulse generator comprising:
   at least one piezoelectric element having opposite sides and extending into a deflection zone, for producing a voltage between said opposite sides when deflected in a predetermined manner;
   a pair of electrical terminals coupled to said opposite sides of each of said at least one element for receiving a voltage produced by said at least one element;
   a plurality of protrusions supported serially at spaced locations and disposed for rotation about an axis of rotation for deflecting said element when traveling through said deflection zone;
   means for driving said protrusions relative to said element through said deflection zone in a manner deflecting said piezoelectric film appropriately for producing a series of voltage pulses between said electrical terminals;
   a shaft shiftable along said axis of rotation and rotatable for rotating said protrusions;
   a second piezoelectric element disposed in a fixed position relative to said shaft; and
   deflection means for deflecting said second element when said shaft is shifted appropriately along said axis of rotation.

4. A pulse generator comprising:
   a plurality of piezoelectric elements having opposite sides and extending into associated deflection zones for producing a voltage between said opposite sides when deflected in a predetermined manner;
   a pair of electrical terminals coupled to said opposite sides of each element for receiving a voltage produced by each element;
   a plurality of protrusions supported serially at spaced locations for deflecting each element when traveling through the associated deflection zones; and
   means for driving said protrusions relative to said elements through said associated deflection zones in a manner deflecting said piezoelectric film appropriately for producing a series of voltage pulses between said electrical terminals, said driving means further comprising body means defining a plurality of sets of indicator location, each set of indicator locations passing through a different one of said deflection zones, with said protrusions being disposed in at least a portion of said indicator locations.

5. A generator according to claim 4 wherein said sets of protrusions are movable simultaneously such that a group formed of an indicator location from each set of indicator locations passes through a respective deflection zone substantially concurrently.

6. A generator according to claim 5 wherein said protrusions are disposed in said sets of indicator locations in a manner producing a predetermined combination of pulses and nonpulses on said terminals associated with said elements for each position of one of said groups of indicator positions in said deflection zones.

7. A generator according to claim 6 wherein all of said indicator locations are contained within said groups of indicator locations.

8. A generator according to claim 7 wherein said indicator locations within each group are disposed circumferentially about an axis of rotation.

9. A generator according to claim 7 wherein said sets of indicator locations are disposed longitudinally along said axis of rotation.

10. A generator according to claim 7 wherein said set of indicator locations are disposed in a plane generally normal to said axis of rotation.

11. A generator according to claim 10 wherein said indicator locations within a group are disposed along a line extending radially from said axis of rotation.

12. A generator according to claim 6 wherein said protrusions are releasably attachable at said indicator locations for varying the predetermined combination of pulses and nonpulses for each group of indicator locations.

13. A pulse generator comprising:
- a plurality of piezoelectric elements having opposite sides and extending into at least one deflection zone;
- a pair of electrical terminals coupled to said opposite sides of each element for receiving a voltage produced by said element;
- a plurality of equally spaced protrusions supported serially at spaced locations for deflecting said plurality of elements when traveling through said at least one deflection zone;
- means for driving said plurality of equally spaced protrusions relative to said plurality of elements through said at least one deflection zone in a manner deflecting said piezoelectric film appropriately for producing a series of voltage pulses between said electrical terminals,
- said plurality of piezoelectric elements producing a voltage between said opposite sides when deflected in a manner to be displaced at different times as said protrusions move through said at least one deflection zone;
- a shaft shiftable along said axis of rotation sand rotatable for rotating said protrusions;
- a second piezoelectric element disposed in a fixed position relative to said shaft; and
- deflection means for deflecting said second element when said shaft is shifted appropriately along said axis of rotation.

14. A generator according to claim 13 wherein said deflection means comprises a ridge extending around said shaft.

* * * * *